United States Patent [19]
Shah

[11] Patent Number: 5,586,298
[45] Date of Patent: Dec. 17, 1996

[54] EFFECTIVE USE OF MEMORY BUS IN A MULTIPROCESSING ENVIRONMENT BY CONTROLLING END OF DATA INTERVENTION BY A SNOOPING CACHE

[75] Inventor: Salim A. Shah, Austin, Tex.

[73] Assignee: Advanced Micro Devices, Inc., Sunnyvale, Calif.

[21] Appl. No.: 467,896

[22] Filed: Jun. 6, 1995

Related U.S. Application Data

[63] Continuation of Ser. No. 993,003, Dec. 18, 1992, abandoned.

[51] Int. Cl.$^6$ .................................................. G06F 12/08
[52] U.S. Cl. ..................... 395/473; 395/460; 395/457; 395/471; 364/DIG. 1
[58] Field of Search ............................. 395/473, 460, 395/425, 457, 471

[56] References Cited

U.S. PATENT DOCUMENTS

| | | | |
|---|---|---|---|
| 4,939,641 | 7/1990 | Schwartz et al. | 395/473 |
| 5,072,369 | 12/1991 | Theus et al. | 395/473 |
| 5,091,846 | 2/1992 | Sachs et al. | 395/250 |
| 5,185,878 | 2/1993 | Baror et al. | 395/473 |
| 5,265,235 | 11/1993 | Sindha et al. | 395/473 |
| 5,335,335 | 8/1994 | Jackson et al. | 395/473 |

FOREIGN PATENT DOCUMENTS

| | | |
|---|---|---|
| 0095598 | 12/1983 | European Pat. Off. . |
| 0304806 | 3/1989 | European Pat. Off. . |

OTHER PUBLICATIONS

Prete, "RST Cache Memory Design For A Tightly Coupled Multiprocessor System", *IEEE Micro*, vol. 11:16–52, (1991).

Primary Examiner—Rebecca L. Rudolph
Attorney, Agent, or Firm—Foley & Lardner

[57] ABSTRACT

A cache control circuit reduces the number of accesses to main memory in a multiprocessing system. The circuit allows a cache memory associated with one Central Processing Unit (CPU) to recognize and respond to memory requests from another CPU, and includes specialized circuitry to support burst-mode operations. Data in one cache memory may be transferred to another cache without the need to access main memory. The direct transfer of requested data between caches in a multiprocessor system results in providing the requested data quickly and also reduces the traffic in the memory bus. By transaction duration can further be reduced by making the snooping cache smarter.

8 Claims, 4 Drawing Sheets

EFFECTIVE USE OF MEMORY BUS IN A MULTIPROCESSING ENVIRONMENT BY CONTROLLING END OF DATA INTERVENTION BY A SNOOPING CACHE

This application is a continuation, of application Ser. No. 07/993,003, filed Dec. 18, 1992 now abandoned.

BACKGROUND OF THE INVENTION

1. Field of the Invention

This invention relates to computer systems using cache memories, and especially to multiprocessing systems in which each processor has its own cache.

2. Discussion of Related art

A computer system would ideally use very fast memory for all of its temporary storage needs. This would allow the Central Processing Unit (CPU) to operate at its designed speed, without the need to wait for slower memory devices. However, slower memory is often used because it is less expensive, consumes less power, and provides more storage in a given space than does very fast memory.

A characteristic of most computer application programs is that they tend to perform repetitive operations on the same or neighboring pieces of data. Cache memory systems take advantage of this characteristic by storing recently accessed data in a small amount of very fast memory, called cache memory. Data which is read from slower main memory is stored in the faster cache memory, so that if a program must subsequently use the same data, it is available in cache memory. Thus, cache memory systems increase the apparent speed of memory accesses in computer systems.

A cache memory system must keep track of main memory addresses for which the associated data is available in the cache. When data is available in the cache, the data is directly provided to the CPU and the main memory is not accessed. This is called a cache "hit."

In a multiprocessor system, all CPUs may share a common main memory. In addition, each CPU may have its own cache memory. In the latter configuration, it is possible that data requested by one CPU is present in the cache of another CPU. Special circuitry is required to take advantage of this fact, i.e., to recognize a memory request from another CPU and then transfer the appropriate data directly between caches.

A special problem may occur when a CPU utilizes a "burst-mode" operation. Burst-mode operations are performed on data in a sequential series of memory locations. Rather than have the CPU execute a new instruction to address each individual memory location, burst-mode allows the CPU to execute a single instruction specifying a starting memory address, an operation to be performed, and the length of the memory block on which to perform the operation. This may cause particular problems in a multiple cache multiprocessor system when the starting memory address for a burst-mode operation starts in one cache and is completed in a different cache, or when all of the requested data is not present in a particular cache. In addition, burst-mode operations are subject to stringent timing requirements which dictate the use of specialized cache circuitry.

SUMMARY OF THE INVENTION

This invention comprises a method of enabling multiple cache memories in a multiprocessor system to work together, and a circuit which implements this method. Additional circuitry for performing burst-mode operations is further disclosed.

In a multiprocessing environment, a cache attached to one CPU may contain data requested by another CPU. This invention discloses a method whereby a cache attached to one CPU can recognize a memory request by another CPU, determine whether it contains the requested data, and then respond to the memory request by transferring the requested data to the appropriate cache. Circuitry for implementing this method is also disclosed.

Timing problems during burst-mode operations are avoided by circuitry in the cache which automatically steps through the memory addresses specified by the operation and decides whether these addresses correspond to the area mapped by the cache. If the requested data is present in the cache, it is transferred to the appropriate cache for use by the requesting CPU. When the burst-mode address moves out of the address range of the cache, or when the burst-mode operation is complete, the cache circuitry relinquishes its control.

Data which is transferred from main memory to cache and then modified is identified by a modification identifier. The modification identifier insures that the updated information in cache can be easily located and written back to the main memory. When data is transferred between caches, the modification identifier is examined and manipulated to indicate the most current information.

DETAILED DESCRIPTION OF THE PREFERRED EMBODIMENTS

Figure 1:
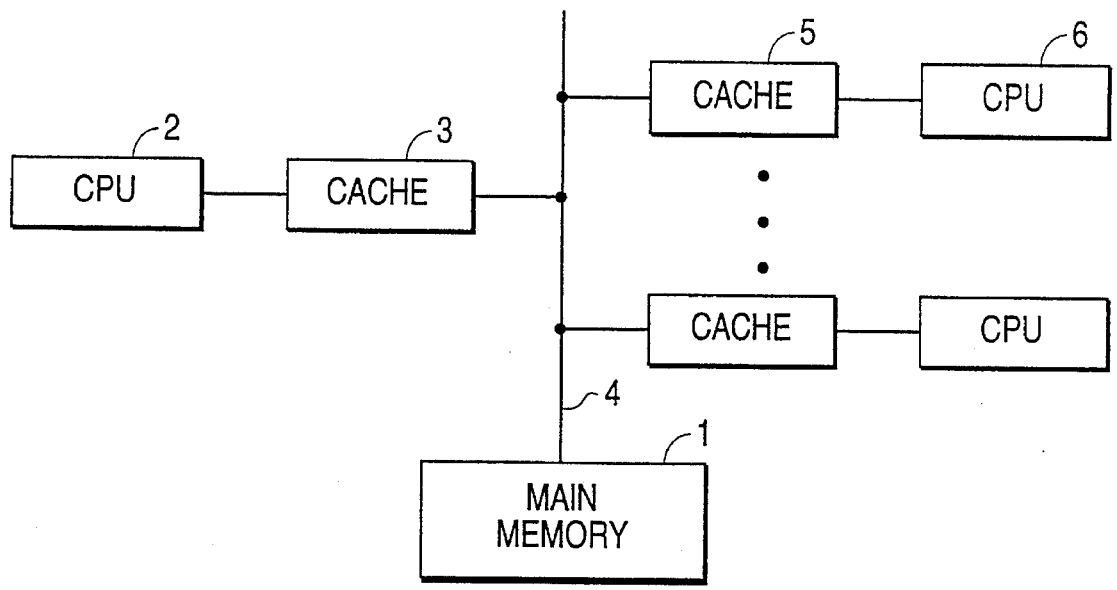
FIG. 1 shows a multiprocessing system with a common main memory and a separate cache for each CPU.

FIG. 1 shows a typical multiprocessing system with a shared main memory 1 and where each CPU 2, 6, etc. has its own cache memory 3, 5, etc. In this system, the cache memories serve not only to increase the speed of memory accesses, but also to reduce the level of contention on the main memory bus 4 for access to main memory 1. Each CPU 2, 6, etc. in this system can typically directly access only its local cache 3, 5, etc. and not a cache attached to another CPU, even if the other cache has the data required by the requesting CPU. However, in this invention, if, for example, CPU 2 requests from cache 3 data which is valid only in cache 5, cache 5 containing the data requested by CPU 2 can recognize the request, determine whether it has the requested data, and transfer this data to cache 3 for use.

Figure 2:
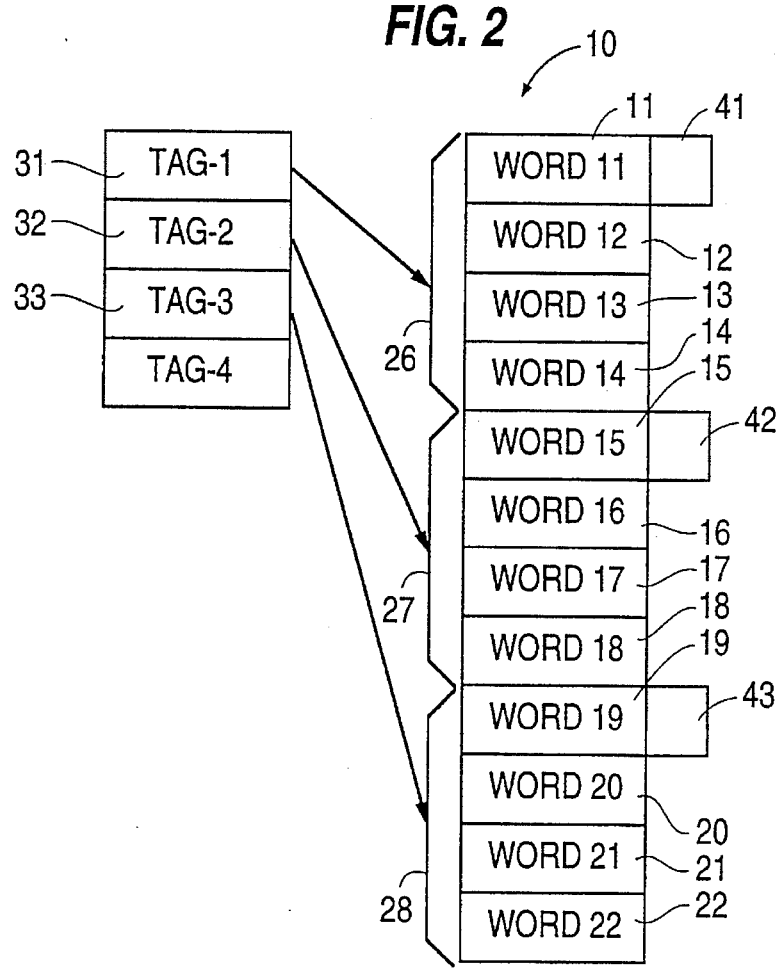
FIG. 2 is an example of the type of cache memory used in this invention.

FIG. 2 is an example of a type of cache memory which can be used in this invention. A section of cache 10 consisting of twelve words 11–22 is shown for purposes of explanation. The words are grouped into blocks of four words each. Block 26 is composed of words 11–14, block 27 is composed of words 15–18, and block 28 is composed of words 19–22. One cache tag points to each block of four words. Cache tag-1 31 points to block 26, cache tag-2 32 points to block 27, and cache tag-3 33 points to block 28. This is called direct mapping since each tag always points to the same block of words. Other configurations, such as set associative memories in which each tag may point to any block in a set of blocks, or fully associative memories in which each tag may point to any block of words, may also be used with the present invention.

"Modify bits" 41–43 are also associated with blocks 26–28. A modify bit associated with a block is "set" to indicate that the data in that block has been modified but not yet copied back to the main memory 1 (FIG. 1), as discussed below.

Data is moved between main memory and cache in blocks of four words, since a tag only points to a four word block. It would be possible to construct a cache memory where a tag points to each word, but this would require the use of a more extensive tag array. Thus, a smaller tag array is used at the expense of having to move data in four word blocks. For instance, if a data word is moved from main memory into cache word 13, all of words 11–14 must be moved, because tag-1 31 will indicate the presence of data in all of block 26.

Data which is modified in cache must subsequently be made available for use by other CPUs or devices when requested. Data which is moved from main memory into cache and not modified may be discarded by the cache, because the correct data already exists in main memory. This cache uses a "modify bit" to indicate whether any of the data in the block has changed since it was read from main memory. Therefore, only blocks with a set modify bit need be copied back into main memory. For instance, if any of words 11–14 in block 26 are changed, modify bit 41 must be set. When data is moved between caches, the modify bit must be manipulated to reflect the proper status of the block so that data integrity is maintained.

It is not necessary that a cache be constructed with four words per block for the operation of this invention. It is important, however, to appreciate the relationships between tags, modify bits, and blocks of words to fully understand this invention.

Figure 3:
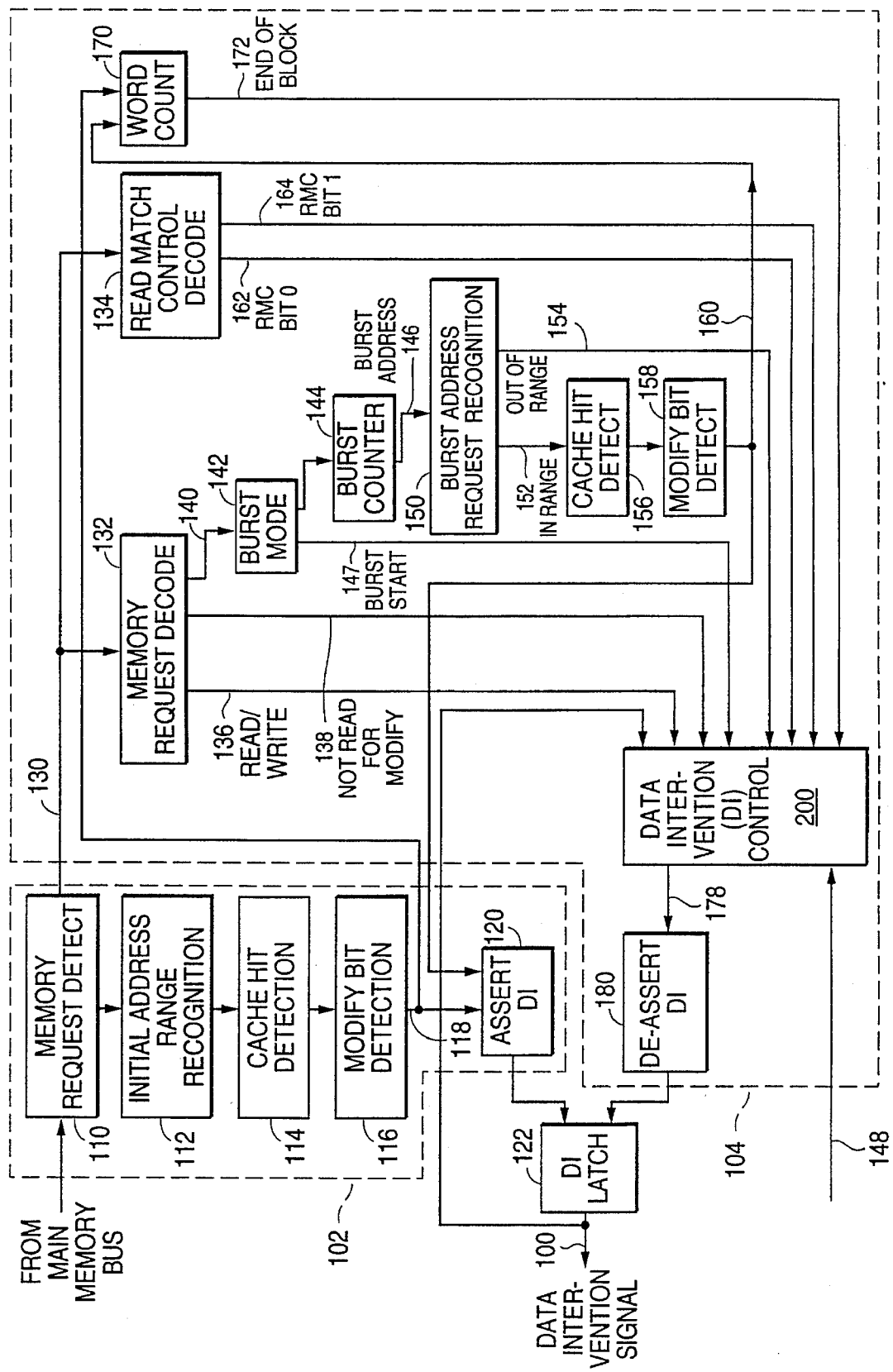
FIG. 3 is a functional block diagram of the circuitry which controls the operation of the Data Intervention (DI) control line.

FIG. 3 is a block diagram of the cache circuitry which controls the operation of the Data Intervention (DI) signal 100. In FIG. 3, circuit block 102 decides when to assert DI signal 100, while circuit block 104 decides when to de-assert DI signal 100. Control of DI signal 100 is based not only on the presence of desired data in the cache, but also on whether the modify bit is currently set, on whether the modify bit will be set by a particular operation, on whether a whole block of data is transferred, and on the parameters of a burst-mode operation.

In circuit block 102, the Memory Request Detect block 110 performs "bus watching" by monitoring the main memory bus 4 for a memory request. If a memory request is detected by block 110, then the address of the memory request is decoded by the Initial Address Range Recognition block 112. Block 112 decides whether the address in the memory request is within the address range serviced by the cache. If not, the memory request is ignored. If the address of the memory request is within the range serviced by the cache, then Cache Hit Detection block 114 decides whether the requested data is available in the cache. If the requested data is in the cache, then the modify bit for the data is examined by the Modify Bit Detection block 116. If the modify bit is set, indicating that the data in cache is the most recent value, then signal 118 is sent to Assert DI block 120, which instructs the DI Latch 122 to assert DI signal 100. The assertion of the DI signal causes the main memory 1 (FIG. 1) to ignore the memory request, and the requested data is supplied by the cache that asserted DI signal 100 to the requesting cache.

The logic for de-asserting DI signal 100 in circuit block 104 is the focus of this invention, and is designed to deactivate as soon as possible without compromising data coherency and thereby freeing up memory bus for other transactions. When a memory request is detected by block 110, signal 130 is generated and sent to the Memory Request Decode block 132 and the Read Match Control Decode block 134.

Memory Request Decode block 132 identifies the type of memory request operation to be performed. Signal 136 indicates whether the operation is a read or a write (Read/Write signal), with a LOW indicating a read operation and a HIGH indicating a write operation. Signal 138 is HIGH if the operation is "Not-Read-For-Modify" and LOW if the operation is "Read-For-Modify." The term "Read-For-Modify" means that the data being read will be modified by the requesting CPU/cache, indicating that the modify bit should be reset since the current value of the variable will now be in the requesting cache and, thus, a full block must be transmitted. In addition, signal 140 is asserted for burst-mode operations.

For burst-mode operations, a Burst-Mode block 142 enables a Burst Counter 144 which generates Consecutive Addresses 146 by incrementing the initial memory address. Burst-Mode block 142 asserts Burst Start signal 147 during a burst request and de-asserts this signal when the burst request has ended. When the responding cache begins to supply data in response to a burst request, it generates a Request Serviced signal 148. Burst Address 146 is checked by Burst Address Range Recognition block 150 to determine whether Burst Address 146 is within the address range serviced by the cache. This is an important step because the initial address of an operation may be within the address range of the cache as determined by Initial Address Range Recognition block 112, but subsequent Burst Addresses 146 may fall outside the range of the cache. If the Burst Address 146 is within range, In Range signal 152 is generated; otherwise Out of Range signal 154 is generated to indicate the Burst Address 146 is outside the address range of the cache. If Burst Address 146 is in range, Cache Hit Detect block 156 determines whether there is a cache hit, and Modify Bit Detect block 158 generates signal 160 if the modify bit is set for the accessed block.

One implementation of the range recognition blocks, 112, 150 and associated circuitry is set forth in co-pending U.S. application Ser. No. 07/993,005, now U.S. Pat. No. 5,502,828, issued Mar. 26, 1996 entitled Reducing Memory Access in a Multi-Cache Multiprocessing Environment, which disclosure is incorporated herein by reference.

The Read Match Control (RMC) Decode block 134 decodes the lower two bits of RMC field. Signal 162 is the value of RMC bit-0 (lowest bit), and signal 164 is the value of RMC bit-1 (second lowest bit). These are protocol bits indicating action to be taken. When bit-0 is HIGH and bit-1 is HIGH, the status of the modify bit may remain unchanged during a data intervention operation. On the other hand, when bit-0 is LOW and bit-1 is HIGH, the modify bit is to be reset during a data intervention operation, indicating that a full block must be read during a read operation.

When Modify Bit Detection block 116 generates signal 118 or Modify Bit Detect block 158 generates signal 160, data may be read from cache. Word Count block 170 generates an End of Block signal 172 which remains HIGH during transmission of a block and goes LOW at the end of a block.

DI Control block 200 decides when to de-assert DI signal 100 by sending signal 178 to De-Assert DI block 180 to clear DI Latch 122. A number of different situations cause DI Control block 200 to de-assert DI signal 100. DI Control block 200 makes this decision based on input signals 100, 136, 138, 147, 148, 154, 162, 164, and 172.

Figure 4:
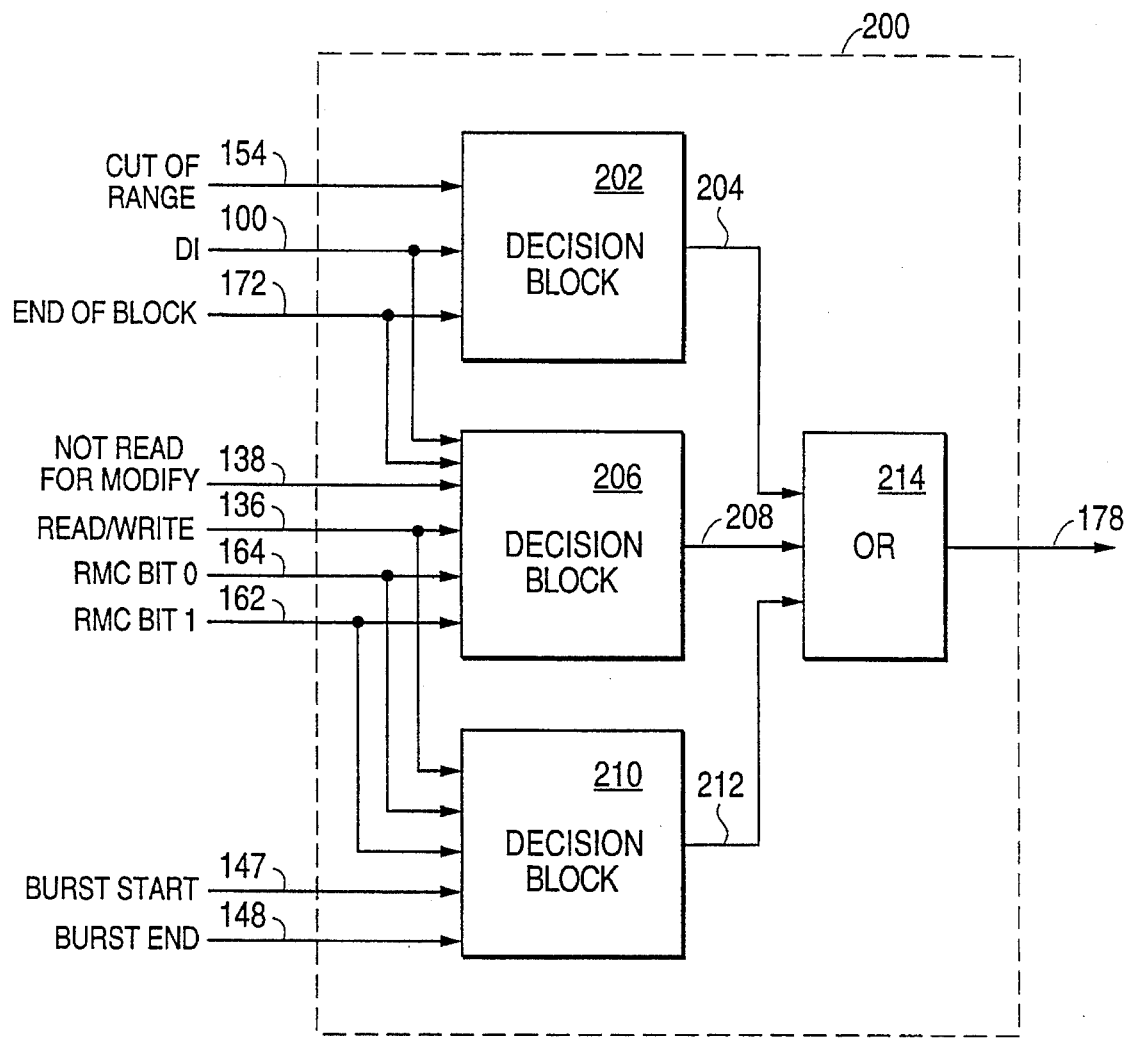
FIG. 4 is a functional block diagram of the circuitry which decides when to de-assert the Data Intervention (DI) control line.

FIG. 4 is a functional block diagram of DI Control block 200. Block 202 produces signal 204 if the burst address Out of Range signal 154 is HIGH while the cache is asserting DI signal 100 and an End of Block signal is asserted. Block 206 produces signal 208 if the cache is asserting DI signal 100, a read operation is indicated by Read/Write signal 136 being LOW, End of Block signal 172 is LOW, the operation is Not-Read-For-Modify (signal 138 is HIGH), and the protocol permits the modify bit to remain unchanged as indicated by the RMC Bit-0 162 being LOW and RMC Bit-1 164 being HIGH. Block 210 produces signal 212 if Read/Write signal 136 is LOW to indicate a read operation, RMC Bit-0 162 is LOW and RMC Bit-1 is HIGH to indicate that the modify bit is not to be reset, Burst Request signal 147 is LOW to indicate that the burst request has stopped, and Request Serviced line 148 is HIGH. If any one of signals 204, 208, or 212 are HIGH, OR block 214 produces signal 178 to de-assert DI signal 100.

Figure 5:
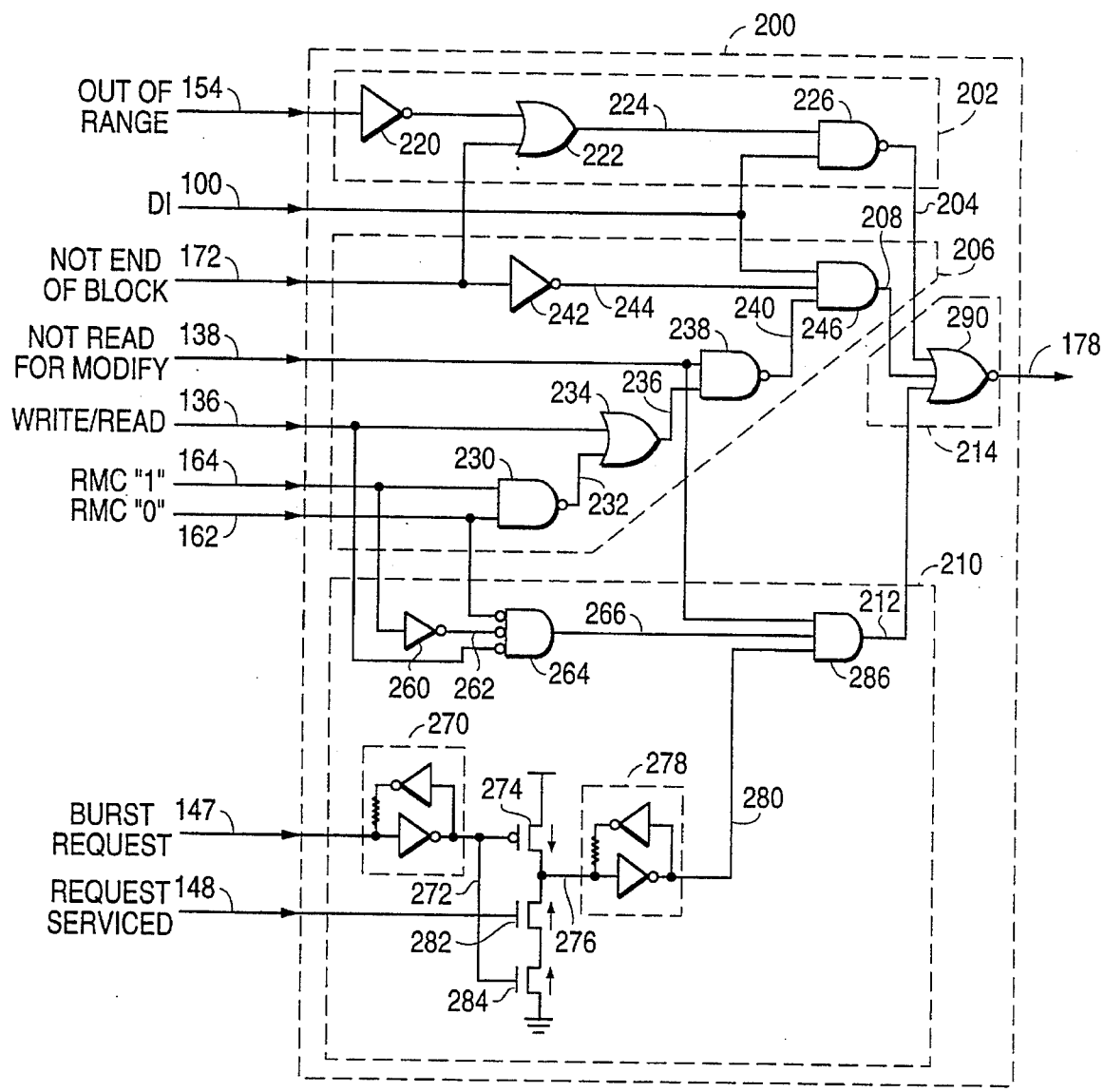
FIG. 5 is a schematic diagram of one embodiment of the circuitry which decides when to de-assert the Data Intervention (DI) control line.

FIG. 5 is a detailed schematic diagram of one embodiment of the circuitry in DI Control block 200 which includes blocks 202, 206, 210 and 214.

The circuitry in block 202 operates as follows:

Out of Range signal 154 is inverted by inverter 220 and combined with End of Block signal 172 in OR gate 222 to produce signal 224. Signal 224 is combined with DI signal 100 in AND gate 226 to produce signal 204. Clearly, when the End of Block signal 172 is LOW indicating that a complete block has been sent, and the Out of Range signal 154 is HIGH, indicating that the current data request is out of the range of the cache, the output of OR gate 224 goes LOW, forcing the output of NAND gate 226 HIGH to reset the DI signal.

The circuitry in block 206 operates as follows:

RMC Bit-0 162 and RMC Bit-1 164 are combined in NAND gate 230 to produce signal 232, which is combined with Read/Write signal 136 in OR gate 234 to produce signal 236. Signal 236 is combined with Not-Read-For-Modify signal 138 in NAND gate 238 to produce signal 240. End of Block signal 172 is inverted by inverter 242 to produce signal 244, which is combined with signal 240 and DI signal 100 in AND gate 246 to produce signal 208.

As is apparent from FIG. 5, if signal 138 is LOW, indicating a read for modify operation, the output of NAND gate 238 is forced HIGH, producing a HIGH output from gate 246 when a complete block is read. Alternately, if RMC bit-0 and bit-1 are both HIGH at the same time that Read/Write signal 136 is LOW, the output of OR gate 234 goes LOW forcing the output of NAND gate 238 LOW. In either case, the DI signal is reset at the end of a block.

The circuitry in block 210 operates as follows:

Normally, Burst Request signal 147 is LOW, as is Request Serviced signal 148. The Burst Request signal 147 is inverted and latched by latch 270, turning OFF FET 274. The LOW signal 148 turns FET 284 OFF, causing line 276 to float.

During a burst request, signal 147 goes HIGH and is inverted and latched by latch 270, forcing signal 272 LOW, which gates Field Effect Transistor (FET) 274 to produce a HIGH signal at input 276 of inverting latch 278, thereby forcing signal 280 LOW. This forces the output of AND gate 286 LOW.

When the cache responds to the data request, it asserts signal 148, turning ON FET 282. After Burst Request signal 147 returns LOW, latch 278 is reset through the series combination of FETs 282 and 284. This drives output 280 of latch 278 HIGH.

If the operation is a read for modify, signal 138 is LOW, forcing the output of gate 286 LOW. Likewise, if the operation is a write operation, the output of gate 286 is forced LOW through gate 264. Or, if the RMC bits call for resetting the modify bit, gate 286 is disabled through the output of gate 264. On the other hand, if the signals 138, 136, 162 and 164 indicate that a read operation is taking place and that the modify bit is not to be reset, signals 138 and 266 to AND gate 286 are set HIGH. When signal 280 goes HIGH, indicating that a request has been serviced and that no burst request is currently being made, output 212 of gate 286 goes HIGH, resetting the DI signal 100. As will be understood, this operation occurs both after a burst request has been made, in which case DI signal 100 is reset as soon as the burst request ceases since there is no need to transmit an entire block, and when there is no burst request. In this latter circumstance, DI signal 100 is reset after a single data word is transmitted.

The circuitry in block 214 operates as follows:

Signals 204, 208, and 212 are combined in NOR gate 290 to produce signal 178. Thus, the occurrence of a condition detected by blocks 202, 206, or 210 to produce signals 204, 208, or 212 respectively, will cause signal 178 to go from high to low, prompting the de-assertion of DI signal 100.

It should be understood that there may be many ways in which the data intervention function may be implemented by those skilled in the art. Various modifications may be made to this embodiment without departing from the scope of this invention as described in the following claims.

What is claimed is:

1. A cache memory system, comprising:

a plurality of cache memory-Central Processing Unit (CPU) combinations including a first and second combination, wherein each of said combinations includes a cache memory and a CPU, each said cache memory storing data in multi-word blocks and an indicator associated with each block indicating whether data stored in said each block is modified or unmodified data; and a common main memory connected to all of said combinations through a memory bus, said common main memory being shared by said combinations, wherein said first combination includes means for requesting data from said common main memory through said memory bus as a requesting combination, and said second combination includes, means for monitoring data requests on said memory bus and, if a data request of said first combination requests data which is present in a particular block of data in the cache of said second combination, for beginning a data intervention operation by asserting a data intervention signal to interrupt access to said common main memory by said first combination and to become a responding combination by providing data requested by the data request of said first combination from the particular block of data to said memory bus, and de-asserting means for determining whether or not an indicator associated with the particular block is to be altered by said second combination in response to the data request of said first combination, and for de-asserting said data intervention signal to end said data intervention operation, at an end of the data request of said first combination if the indicator associated with the particular block of data is not to be altered by said second combination, or after the particular block of data is completely read from the cache of said second combination if the indicator associated with the particular block of data is to be altered by said second combination.

2. A cache memory system as claimed in claim 1, wherein said first combination includes means for responding to a burst request by transmitting sequential data until said burst request ends, and said de-asserting means comprises means for receiving a signal indicating that data required to respond to a continued burst request is out of a cache memory range and for de-asserting said data intervention signal in response thereto.

3. A cache memory system as claimed in claim 2, wherein said de-asserting means comprises:

means for receiving a read-for-modify signal indicating whether the data request of said first combination will modify the requested data; and means for receiving an indication of an end of said burst request sent from said first combination, wherein said data intervention signal is de-asserted irrespective of whether the entire sequential data corresponding to said burst request has been transmitted from said second combination when both the end of said burst request is received and the read-for-modify signal indicates that said first combination will not modify the requested data.

4. A cache memory system as claimed in claim 1, wherein said de-asserting means comprises means for receiving a read-for-modify signal indicating that the data request of said first combination will modify the requested data such that the indicator associated with the particular block is to be altered by said second combination, and, in response thereto, de-asserting said data intervention signal only after the particular block of data is completely read from the cache of said second combination.

5. A cache memory system as claimed in claim 4, wherein said de-asserting means further comprises means for receiving a protocol signal indicating that the indicator associated with the particular block is to be altered after said data intervention operation, and, in response thereto, de-asserting said data intervention signal only after the particular block of data is completely read from the cache of said second combination.

6. A cache memory system as claimed in claim 5, wherein said de-asserting means comprises burst means for receiving a burst request signal, maintaining said data intervention signal during the presence of said burst request signal, and deasserting said data intervention signal after said burst request signal is de-asserted only in the absence of said read-for-modify signal and said protocol signal.

7. A cache memory system as claimed in claim 6, wherein said burst means includes a latch to store said burst request signal, and means for resetting said latch only upon de-assertion of said burst request signal in combination with assertion of a signal indicating servicing of a request.

8. A device for providing data from a cache memory of a corresponding processor to a common bus connected to a main memory, data being stored in the cache memory in multi-word blocks with an indicator associated with a corresponding block indicating whether data stored in the corresponding block is modified data, the main memory being accessed by a plurality of processors via the common bus, the device comprising:

a bus monitoring circuit connected to the common bus and configured to monitor for data requests to the main memory from processors other than the corresponding processor;

a data intervention asserting circuit connected to the common bus and the bus monitoring circuit and configured to assert a data intervention signal to the common bus to prevent access to the main memory by a requesting processor when a data request monitored by the bus monitoring circuit requests data from the main memory which is also stored in an identified block of the cache memory;

determining means for determining whether an operation for which the data request requests data requires that an indicator associated with the identified block be changed; and a data intervention de-asserting circuit connected to the common bus and to the determining means and configured to de-assert the data intervention signal as soon as the data requested by the data request is provided to the common bus if the indicator associated with the identified block is not to be changed, and to de-assert the data intervention signal after an entire content of the identified block is provided to the common bus if the indicator associated with the identified block is to be changed.

* * * * *